United States Patent
Gaertner et al.

(10) Patent No.: US 8,836,987 B2
(45) Date of Patent: Sep. 16, 2014

(54) PRINT QUEUE MANAGEMENT IN A PRINT SHOP ENVIRONMENT

(75) Inventors: Joseph P. Gaertner, Lafayette, CO (US); Joan Stagaman Goddard, Boulder, CO (US); Janeen E. Jahn, Lafayette, CO (US); Kumar V. Kadiyala, Boulder, CO (US); Marquis G. Waller, Beverly, OH (US)

(73) Assignee: Ricoh Company, Ltd., Tokyo (JP)

( * ) Notice: Subject to any disclaimer, the term of this patent is extended or adjusted under 35 U.S.C. 154(b) by 561 days.

(21) Appl. No.: 13/011,010

(22) Filed: Jan. 21, 2011

(65) Prior Publication Data

US 2012/0188587 A1 Jul. 26, 2012

(51) Int. Cl.
 *G06K 15/00* (2006.01)
 *G06F 3/12* (2006.01)
(52) U.S. Cl.
 CPC .............. *G06F 3/1213* (2013.01); *G06F 3/126* (2013.01); *G06F 3/1288* (2013.01)
 USPC .......... 358/1.16; 358/1.15; 358/1.14; 358/1.1
(58) Field of Classification Search
 None
 See application file for complete search history.

(56) References Cited

U.S. PATENT DOCUMENTS

| | | | | |
|---|---|---|---|---|
| 7,369,264 | B2 * | 5/2008 | Kobayashi | 358/1.16 |
| 7,602,514 | B2 * | 10/2009 | Levin et al. | 358/1.15 |
| 2002/0143915 | A1 * | 10/2002 | Mathieson | 709/223 |
| 2010/0091318 | A1 * | 4/2010 | Ferlitsch | 358/1.15 |
| 2010/0238484 | A1 * | 9/2010 | Komine | 358/1.15 |
| 2012/0057191 | A1 * | 3/2012 | Gnanasambandam et al. | 358/1.15 |
| 2012/0092702 | A1 * | 4/2012 | Isidore | 358/1.15 |

FOREIGN PATENT DOCUMENTS

JP 05265777 A * 10/1993 .............. G06F 9/46

* cited by examiner

*Primary Examiner* — Hilina K Demeter
(74) *Attorney, Agent, or Firm* — Duft Bornsen & Fettig LLP

(57) ABSTRACT

Systems and methods for print queue management are provided. The system performs a queue management process to identify a print job loaded in a first queue for a first printer, and to estimate a first time to print the print job on the first printer from the first queue. The system selects a second queue for a second printer, estimates a second time to print the print job on the second printer from the second queue if the print job were moved to the second queue, and calculates a difference in printing time between the first time to print and the second time to print. The system also moves the print job from the first queue to the second queue based on the calculated difference in printing time.

17 Claims, 5 Drawing Sheets

PRINT QUEUE MANAGEMENT IN A PRINT SHOP ENVIRONMENT

FIELD OF THE INVENTION

The invention relates to the field of print scheduling, and in particular, to print queue management in a print shop environment.

BACKGROUND

Print shops are typically medium or large scale facilities capable of supplying printing services to meet a variety of customer demands. For example, print shops are often used to print documents used for mass-mailing (e.g., customer bills, advertisements, etc). Because print shops engage in printing on a scale that is hard to match, their customer base is usually varied. Print shop clients may therefore include both large institutional clients (e.g., credit card companies and banks), and small clients (e.g., small businesses and churches).

Print shops are generally arranged to print incoming jobs from clients in a way that is economical, yet fast. Thus, print shops often include a number of high-volume printers capable of printing incoming jobs quickly and at high quality. These printers may be managed by operators who can remove paper jams and reload the printers with media. Print shops also typically include post-processing devices that are used to process the printed documents of each job (e.g., stackers, staplers, cutters, binders, etc.). Because print shops serve a variety of clients, they are often tasked with printing jobs that have varying printing formats, delivery dates, and media requirements. Print shops therefore often use a centralized print server that coordinates activity between printers of the print shop and clients. The print server schedules incoming jobs and forwards them to the printers they are directed to.

In print shops, print servers may include dedicated print schedulers for directing incoming print jobs to different printers. A print scheduler receives print jobs directed to the print server, and assigns these print jobs to print queues for the printers. Once incoming print jobs have been scheduled, unanticipated events may occur that impact the printing time of a job in a queue. For example, a printer may encounter a paper jam that halts printing for several minutes, or a printer may be cleaned or aligned to restore optimal printing quality. In these situations, print jobs that have been assigned to the printer's queue take longer to print than originally anticipated by the print scheduler. This may be true even though other printers have become available to print the print job during the delay.

SUMMARY

Embodiments described herein move print jobs between queues of printers when a re-assignment will result in the print job being printed faster. A print server determines whether a print job can be printed faster by estimating its printing time on different printers. If the job can be printed faster on another printer by a certain amount of time, then the print shop scheduler moves the job to the queue for the other printer. This advantageously increases the speed of the print shop.

One embodiment is a system for print queue management. The system comprises a control system operable to perform a queue management process to identify a print job loaded in a first queue for a first printer, and to estimate a first time to print the print job on the first printer from the first queue. The control system is also operable to select a second queue for a second printer, to estimate a second time to print the print job on the second printer from the second queue if the print job were moved to the second queue, and to calculate a difference in printing time between the first time to print and the second time to print. The system further comprises a queue management system operable to move the print job from the first queue to the second queue based on the calculated difference in printing time.

In another embodiment, a method is disclosed for print queue management. The method includes identifying a print job loaded in a first queue for a first printer, and determining whether to move the print job from the first queue to a second queue for a second printer. The determination is made by estimating a first time to print the print job in the first queue for the first printer, selecting a second queue for a second printer, and estimating a second time to print the print job if the print job were moved to the second queue. According to the method, a difference in printing time between the first time to print and the second time to print is calculated. The print job is moved from the first queue to the second queue based on the calculated difference.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
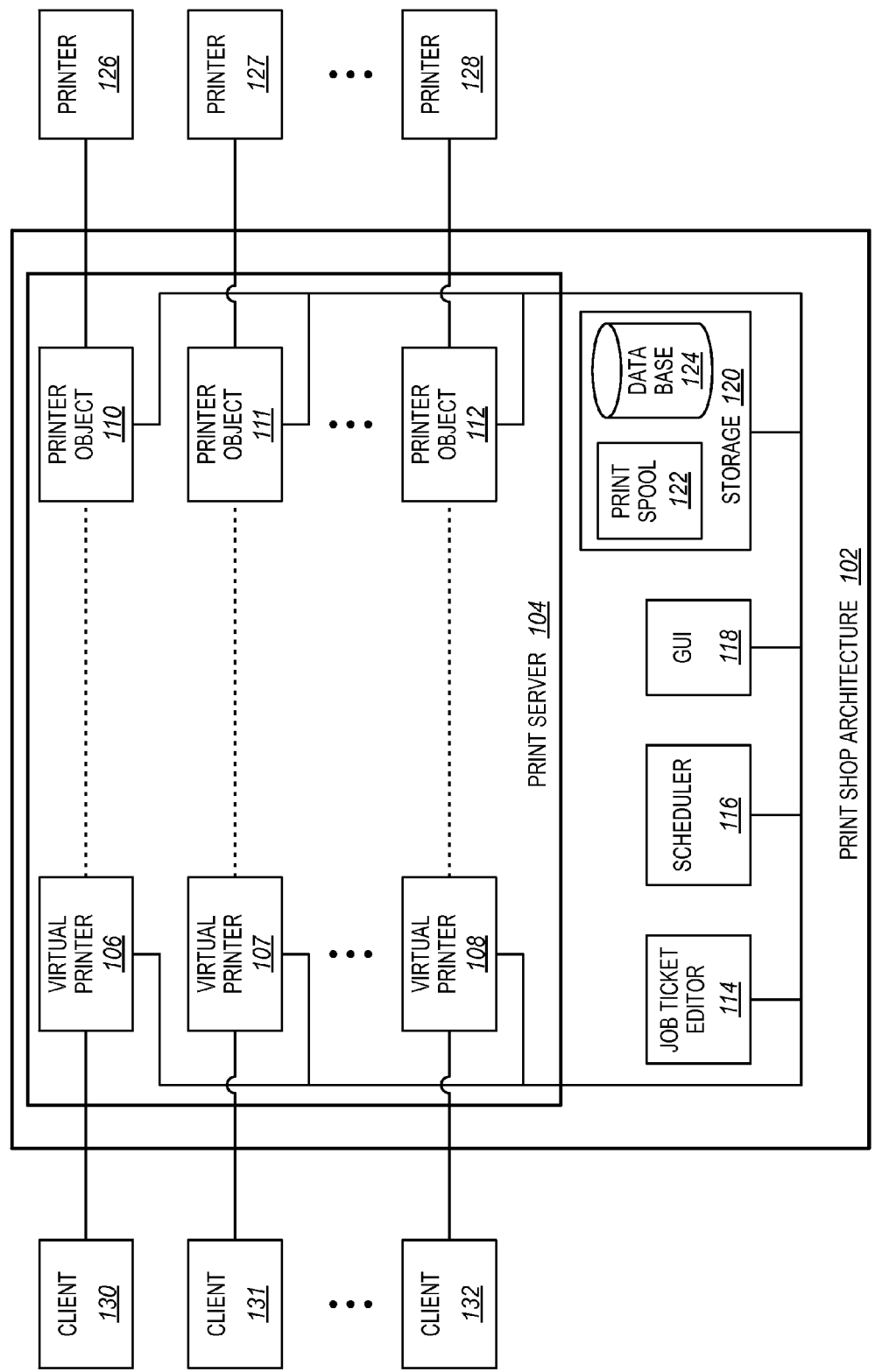
FIG. 1 is a block diagram illustrating a print shop architecture in an exemplary embodiment.

FIG. 1 is a block diagram illustrating a print shop architecture 102 in an exemplary embodiment. Print shop architecture 102 couples one or more clients 130-132 to one or more printers 126-128 to provide printing and print workflow services to clients 130-132. Print shop architecture 102 is operable to receive print jobs and job tickets from clients 130-132 for printing on printers 126-128. Clients 130-132 may include banks, credit card companies, or other entities with printing needs (e.g., monthly bank statements, monthly credit card bills, etc.). Print shop architecture 102 may receive print jobs from clients 130-132 in a number of different formats, such as Portable Document Format (PDF), Mixed Object: Document Content Architecture (MO:DCA), etc. Job tickets may be received from clients 130-132 in a number of different formats, such as Job Definition Format (JDF), Print Production Format (PPF), Portable Job Ticket Format (PJTF), etc. Printers 126-128 generally include systems for transforming print data onto a suitable printable medium, such as paper, and generally are large production printing systems for high volume printing. Printers 126-128 may report their current printing progress to print shop architecture 102. In one embodiment, this progress report indicates that an entire print job or fraction thereof has been completed by the printer.

Print shop architecture 102 includes a print server 104 having one or more virtual printers 106-108. Virtual printers 106-108 communicate with clients 130-132 and provide an interface similar to a printer driver to allow clients 130-132 to set up print jobs and send print jobs (and a job ticket associated with the print job) to print shop architecture 102. When clients 130-132 send print jobs and job tickets to print shop architecture 102, the job tickets are scanned into a database 124 located in storage 120 of print shop architecture 102. The print jobs are then stored in a print spool 122 of storage 120 as open jobs prior to queuing the print jobs for printing. A scheduler 116 identifies the open jobs located in print spool 122 and attempts to schedule the jobs at a queue of one or more printer objects 110-112. Typically, scheduler 116 attempts to schedule the open jobs at one of printer objects 110-112 corresponding with virtual printers 106-108 that received the print job. For example, if client 130 transmitted the print job to virtual printer 106, then scheduler 116 may first attempt to place the print job at a queue of printer object 110. Generally, printer objects 110-112 interface with corresponding printers 126-128 to queue and process print jobs prior to transmitting the jobs to printers 126-128.

A printer operator may use a user interface of print shop architecture 102 to control and identify the status of jobs at print shop architecture 102. For example, user interface 118 may provide a list of print jobs in queues of printer objects 110-112 and other general information about the status of open jobs in print spool 122.

The printer operator may also use a job ticket editor 114 to modify job tickets associated with both open and queued print jobs. Using job ticket editor 114, the printer operator may modify job tickets to change various print options for a print job associated with the job ticket, such as duplexing, stapling, media type, etc.

Figure 2:
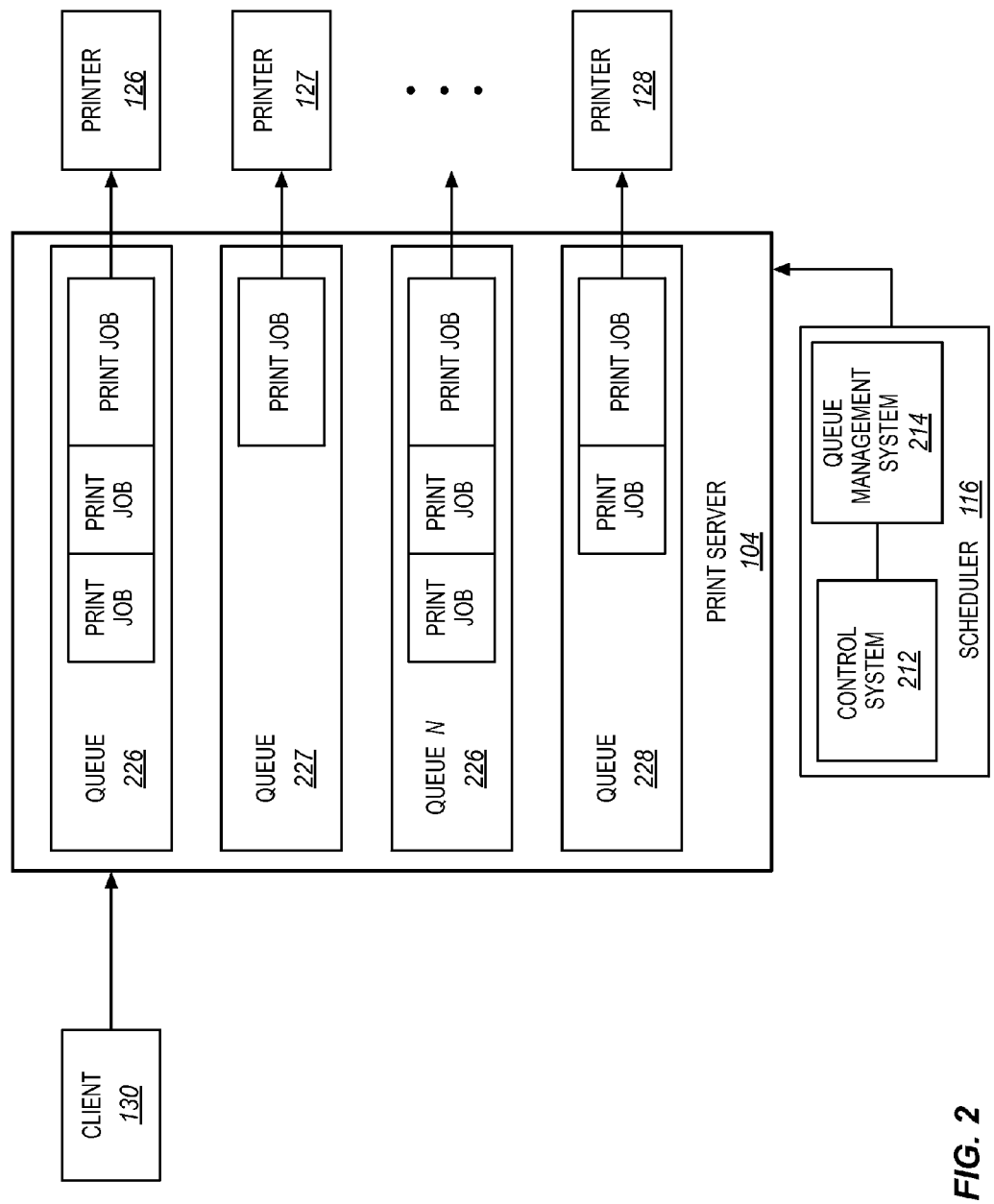
FIG. 2 is a block diagram of a scheduler in an exemplary embodiment.

Print shop architecture 102 provides a number of printing and workflow services to clients 130-132 which will become more readily apparent through the following discussion and related figures. For example, FIG. 2 illustrates a scheduler 116 that may be implemented in print shop architecture 102 to reschedule print jobs that are already within queues for printers 126-128. When scheduler 116 determines that a print job can be printed faster by moving it to another queue, it moves the print job to the other queue.

FIG. 2 is a block diagram of a scheduler 116 in an exemplary embodiment. Scheduler 116 comprises any system, device, or component operable to manage print queues for multiple printers. Scheduler 116 estimates the time to complete a print job if it were moved to a different queue than the one it currently resides in. When scheduler 116 determines that moving the print job to a different queue will increase the printing speed of the job, it moves the job to the different queue, thus allowing the job to be printed faster.

In this embodiment, scheduler 116 comprises control system 212 and queue management system 214. Control system 212 comprises any system, device, or component operable to estimate a time to print a job that is loaded in a queue for a printer. Queue management system 214 comprises any system, device, or component operable to access and modify queues for printers 126-128. The queues for printers 126-128 are stored as queues 226-228 of print server 104. Each queue 226-228 includes print jobs to be printed by a specific printer.

Typically, incoming jobs to print server 104 accumulate at print spool 122 and are scheduled by scheduler 116 to queues of printer objects 110-112. However, scheduler 116 is also operable to perform a queue management process whenever a triggering event occurs (e.g., a specific period of time has passed, a print job has been moved between queues, etc.). In this queue management process, scheduler 116 reviews print jobs within the system to determine if they can be rescheduled for faster printing, and then moves the jobs between queues if they can be printed faster by a certain amount of time. This may be desirable because it allows scheduler 116 to account for unanticipated events (e.g., paper jams) that may have slowed or stopped printers 126-128 since the last time the scheduling process was performed.

Figure 3:
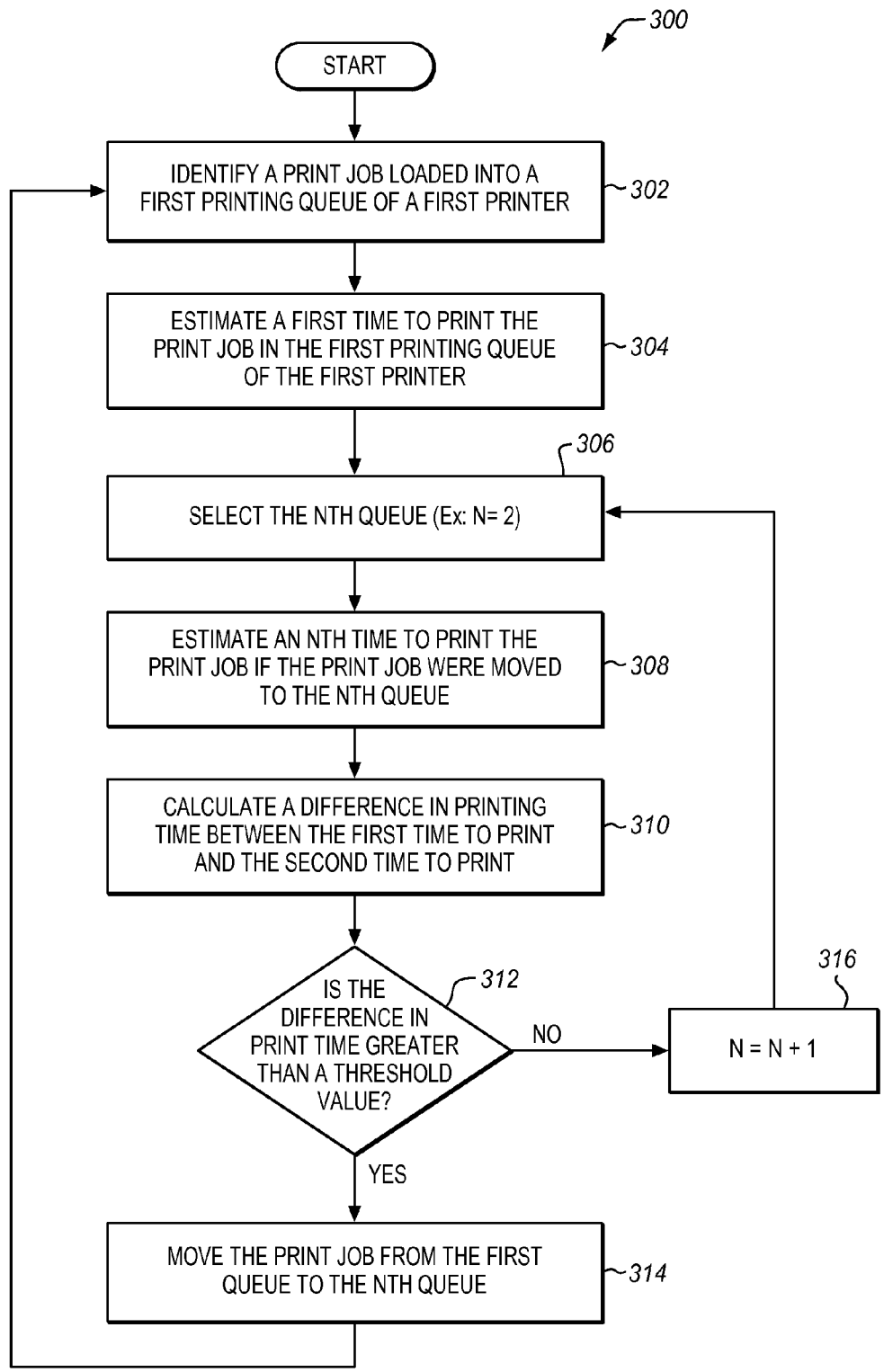
FIG. 3 is a flowchart illustrating a method of print queue management in an exemplary embodiment.

FIG. 3 is a flowchart illustrating a method 300 of print queue management in an exemplary embodiment. The steps of method 300 are described with reference to scheduler 116 of FIG. 2, but those skilled in the art will appreciate that method 300 may be performed in other systems and devices. The steps of the flowcharts described herein are not all inclusive and may include other steps not shown. The steps described herein may also be performed in an alternative order.

At step 302, control system 212 identifies a print job loaded in a queue for a printer. For example, assume that control system 212 identifies a print job in queue 226 for printer 126. This print job may be identified by scheduler 116 based upon pre-existing criteria (e.g., a list of print jobs, parameters for identifying specific print jobs, etc.). In one embodiment, print jobs are identified based upon the order that they were received by print server 104.

At step 304, control system 212 estimates a time to print the print job on printer 126 from queue 226. Estimating the time to print may include determining the number of pages to be printed by printer 126 from queue 226. For example, the number of pages may include the total number of pages in queue 226 (including the pages of the identified print job). The estimation process may further include dividing the number of pages to be printed by a speed of printer 126. The printer's speed may be reported by printer 126, or may be stored in the system. In one embodiment, printer speeds that are reported by the printer are replaced with a value provided by a printer operator. Replacing a self-reported printer speed with a user-defined value may help scheduler 116 to account for the unique properties of the printer as it is presently configured. For example, if the media used within the printer causes more paper jams than typical print media, a printer operator can account for the increased likelihood of paper jams on the printer by reporting a lower printing speed than the printer itself would report.

At step 306, control system 212 selects a second queue to compare with the first queue. For example, assume that control system 212 selects queue 227 for printer 127. Queue 227 may be selected based upon an algorithm (e.g., the queue having the lowest number of print jobs to print). In one embodiment, queues are each assigned an index number, and control system 212 selects a specific queue based upon its index number. For example, according to step 306, control system 212 may select the queue associated with an index number (N) of two.

At step 308, control system 212 estimates a time to print the job on printer 127 from queue 227 if the print job were moved to queue 227. This time is typically the time it would take to print the job if it were placed at the end of queue 227. However, the location within queue 227 may be selected so that the print job is grouped with other jobs having similar media or ink requirements.

At step 310, control system 212 calculates a difference in printing time between the time to print the print job from queue 226 and the time to print the print job from queue 227. The difference in printing time may reflect how much faster the print job would be printed if it were moved from queue 226 to queue 227, or the difference in printing time may reflect how much faster it would be to initiate printing of the print job if it were moved from queue 226 to queue 227.

At step 312, control system 212 compares the difference in printing time to a threshold value. The threshold value indicates a minimum time savings that a user wishes to achieve before moving a print job from one queue to another. A threshold value thereby ensures that print jobs are not moved between queues unless appreciable time savings are achieved.

Additionally, a threshold value may be used to avoid a "pinball" scenario, where a job repeatedly jumps from a first queue to a second queue and then back to the first. To illustrate, consider two printers that print at similar speeds and have queues that are similar sizes. In this situation, the printer with the fastest estimated printing time may change because each page within a queue may take a different amount of time to print than originally estimated. Thus, if there is no threshold value, a print job may be moved between the queues as each printer reports it has completed printing a page. This "pinball" effect may confuse printer operators, who will encounter difficulty predicting which printer the job will actually be printed on. Using a threshold value helps alleviate this "pinball" problem.

At step 314, queue management system 214 moves the print job from queue 226 to queue 227 responsive to determining that the difference in printing time exceeds the threshold value. Moving a print job from queue 226 to queue 227 may be a simple software operation such as modifying an internal list.

In one embodiment, the queue management process described above may be performed with many different queues. For example, at step 316, if the difference in printing time is not greater than the threshold value, then control system 212 selects another queue to compare with the queue 226. In this example, control system 212 selects the other queue by increasing the value of an index number N. Control system 212 then continues at step 308 with the Nth queue instead of the second queue. When N queues are evaluated to decide whether to move a print job, queue management system 214 may refrain from moving the print job until after it has evaluated all N queues. Queue management system 214 then moves the job to the queue that will provide the maximum reduction in printing time, so long as it exceeds the threshold value.

In a further embodiment, scheduler 116 initiates the queue management process for a print job described with regard to FIG. 3 whenever a triggering event occurs. Thus, if an unexpected delay occurs for the printer scheduled to print the print job, scheduler 116 may account for the delay after it has repeated the queue management process for the print job. A variety of events may trigger the queue management process. For example, the passage of a specific period of time may trigger the process. Repeating the queue management process at defined intervals of time ensures that estimations made by scheduler 116 do not become outdated. In another example, the triggering event may include printing a print job at a printer, or moving a print job between queues. In these situations, repeating the queue management process may help scheduler 116 to take advantage of newly available space at a queue.

Once scheduler 116 has completed the queue management process described above, it may be desirable to display the location of the print jobs in queues 226-228 at user interface 118. In this display, the width of each print job in a queue may reflect the estimated time that a printer for the queue will take to print the job.

The embodiments described above thereby provide systems and methods for printer queue management that are capable of determining whether a print job in a queue can be printed faster by moving it to another queue, and are also capable of moving the print job to the other queue if the print job can be printed at least a minimum amount faster at the other queue.

EXAMPLE

Figure 4:
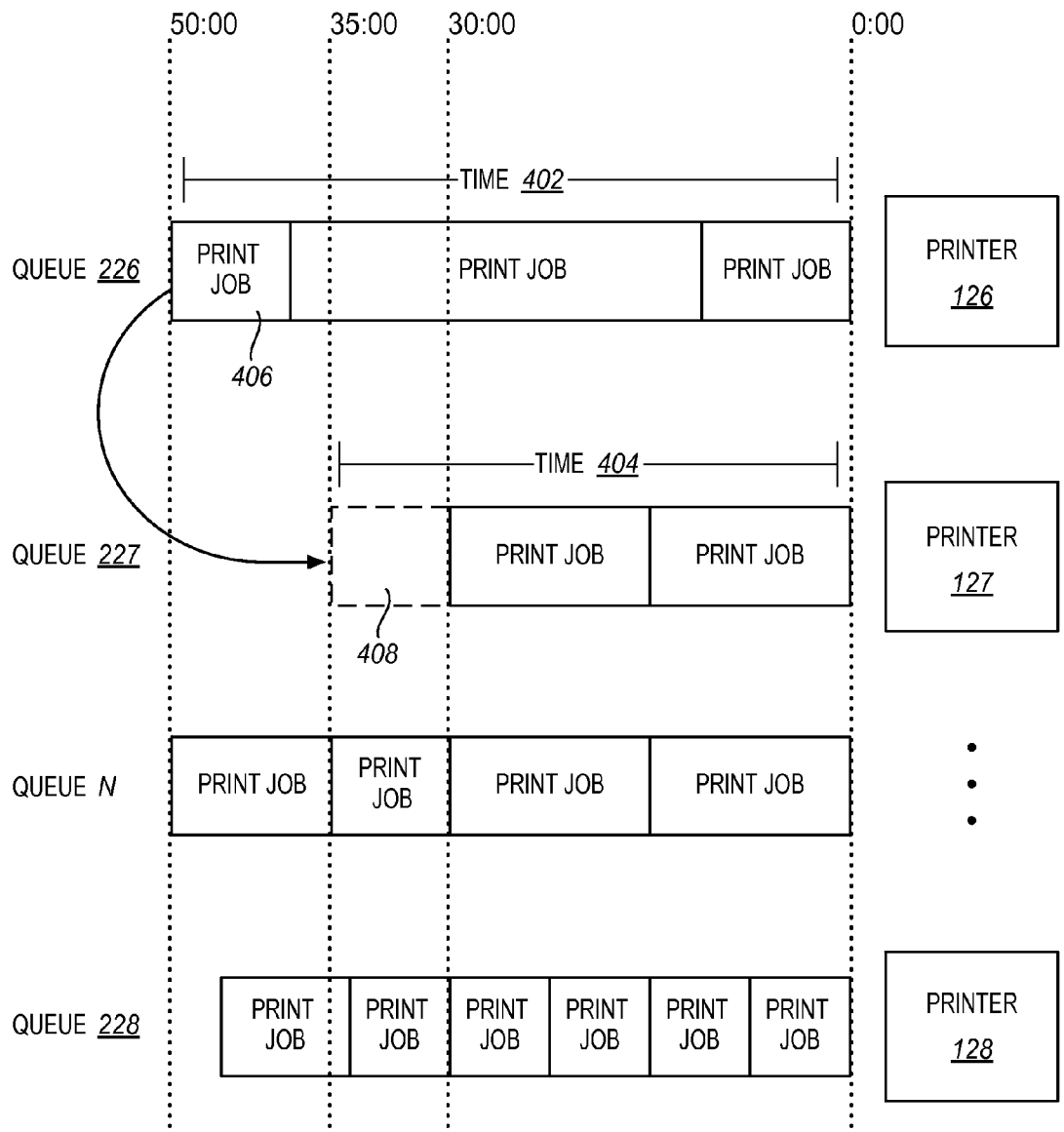
FIG. 4 illustrates the method of FIG. 3 applied in an exemplary embodiment.

FIG. 4 illustrates the method 300 of FIG. 3 applied in an exemplary embodiment. In this example, print server 104 stores internal queues 226-228 that are associated with printers 126-128, respectively. Scheduler 116 manages print jobs and uses queue management system 214 to move print jobs between queues. The queue management process in this example is triggered by scheduler 116 at five minute intervals.

The following description explains how scheduler 116 decides to move print job 406 from queue 226 to queue 227. Scheduler 116 first identifies print job 406 by selecting the last job scheduled to print at queue 226. Control system 212 then estimates time 402 for print job 406 in queue 226, and determines that print job 406 will take fifty minutes to print if it remains in queue 226. Control system 212 selects a second queue (queue 227 for printer 127) for comparison by choosing the queue that has the smallest number of jobs. Control system 212 estimates a second printing time 404 of print job 406 in queue 227, and determines that print job 406 will take thirty-five minutes to print if it is moved. Control system 212 calculates a difference between the two times by subtracting time 404 from time 402, and determines that printing time can be reduced by fifteen minutes if print job 406 is moved to queue 227.

Control system 212 then selects the queue with the next smallest number of print jobs (queue N), estimates the time for print job 406 to print on queue N, and compares this time to time 402. Here, time 402 is shorter than the time it would take for print job 406 to print on queue N, so no time would be saved by moving print job 406 to queue N. The same process is carried out with queue 228 (queue with the next smallest number of print jobs), and control system 212 determines that no time would be saved by moving print job 406 to queue 228.

Once times for all queues have been estimated, control system 212 picks the queue for the printer that will print the job earliest (here, queue 227), and chooses this queue as a "candidate" queue. Control system 212 then compares the time savings of the candidate queue (here, fifteen minutes) against a threshold value. In this example, the threshold value is ten minutes. Here, the time savings to be had by moving print job 406 to queue 227 is greater than the threshold value. Thus, queue management system 214 moves the print job from queue 226 to location 408 within queue 227 by altering internally stored queue data, thereby saving fifteen minutes of printing time for print job 406.

Figure 5:
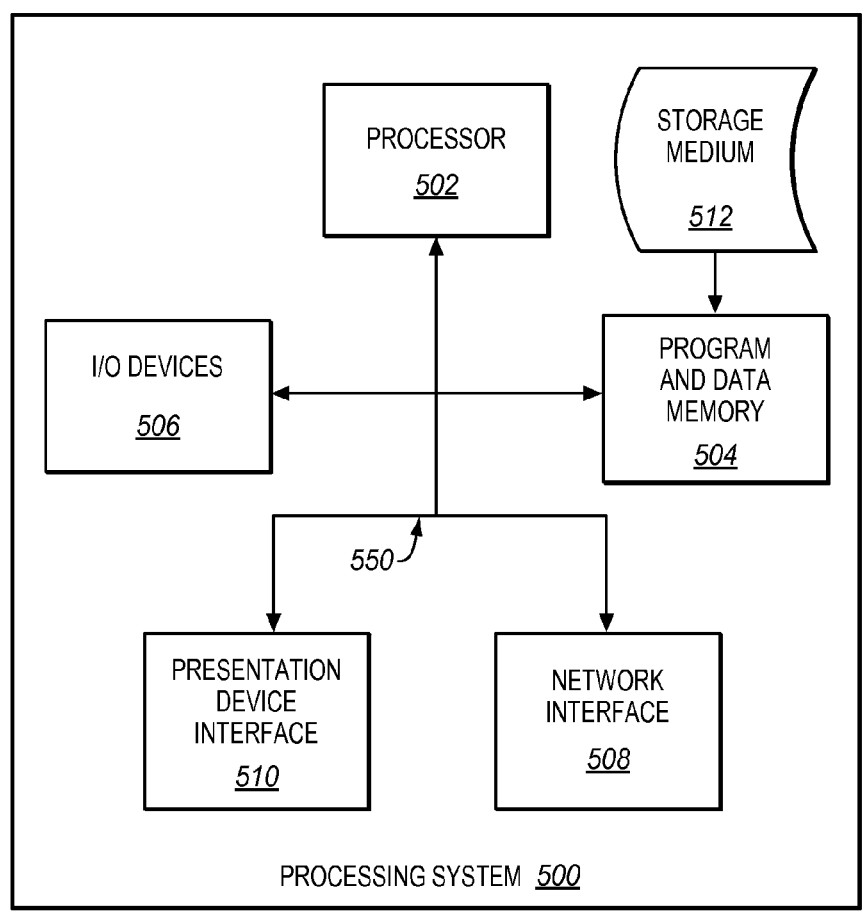
FIG. 5 illustrates a processing system operable to execute a computer readable medium embodying programmed instructions to perform desired functions in an exemplary embodiment.

As mentioned, embodiments disclosed herein can take the form of software, hardware, firmware, or various combinations thereof. In one particular embodiment, software is used to direct a processing system of scheduler 116 to perform the various operations disclosed herein. FIG. 5 illustrates a processing system 500 operable to execute a computer readable medium embodying programmed instructions to perform desired functions in an exemplary embodiment. In this regard, embodiments of the invention can take the form of a computer program accessible via the computer-readable medium 512 providing program code for use by a computer or any other instruction execution system. For the purposes of this description, a computer readable storage medium 512 can be anything that can contain or store the program for use by the computer.

The computer readable storage medium 512 can be an electronic, magnetic, optical, electromagnetic, infrared, or semiconductor device. Examples of the computer readable storage medium 512 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

The processing system 500, being suitable for storing and/or executing the program code, includes at least one processor 502 coupled to memory elements 504 through a system bus 550. The memory elements 504 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 506 (including but not limited to keyboards, displays, pointing devices, etc) can be coupled to the system either directly or through intervening I/O controllers. Network adapter interfaces 508 may also be coupled to the system to enable the computer system 500 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 510 may be coupled to the system to interface to one or more presentation devices, such as printing systems and displays for presentation of presentation data generated by processor 502.

Although specific embodiments were described herein, the scope of the invention is not limited to those specific embodiments. The scope of the invention is defined by the following claims and any equivalents thereof.

We claim:

1. A print server comprising:
   a control system that performs a queue management process to identify a print job loaded in a first queue for a first printer, to estimate a first time to complete printing the print job on the first printer from the first queue, to select a second queue for a second printer, to estimate a second time to complete printing the print job on the second printer from the second queue if the print job were moved to the second queue, to calculate a difference in printing time between the first time to complete printing and the second time to complete printing, and to compare the difference in printing time to a threshold value; and
   a queue management system that moves the print job from the first queue to the second queue if the second time to complete printing is less than the first time to complete printing and the difference in printing time exceeds the threshold value, wherein:
   over a period of time the control system repeatedly performs the queue management process for the print job to estimate the first time, select the second queue, estimate the second time, and calculate the difference, and
   over the period of time the queue management system repeatedly moves the print job between the queues if the second time to complete printing is less than the first time to complete printing and the difference in printing time exceeds the threshold value.

2. The print server of claim 1, wherein:
   the control system performs the queue management process whenever a predetermined amount of time has passed.

3. The print server of claim 1, wherein:
   the control system further:
   determines a speed of the first printer;
   determines a number of pages to be printed in the first queue; and
   estimates the first time to complete printing by dividing the number of pages to be printed in the first queue by the speed of the first printer.

4. The print server of claim 1, wherein:
   the control system initiates the queue management process each time a triggering event is detected by the print server.

5. The print server of claim 4, wherein:
   the triggering event comprises one of: waiting a specific period of time, moving a print job between queues, or printing a print job.

6. The print server of claim 1, wherein:
   the control system further estimates a third time to complete printing the print job on a third printer from a third queue if the print job were moved the third queue, and calculates another difference in printing time between the first time to complete printing and the third time to complete printing; and
   the queue management system further moves the print job from the first queue to the third queue if the other difference in printing time exceeds the threshold value.

7. A method of providing a queue management process in a print server, the method comprising:
   identifying a print job loaded in a first queue for a first printer;
   determining whether to move the print job from the first queue to a second queue for a second printer by:
   estimating a first time to complete printing the print job in the first queue for the first printer;
   selecting a second queue for a second printer;
   estimating a second time to complete printing the print job if the print job were moved to the second queue;
   calculating a difference in printing time between the first time to complete printing and the second time to complete printing; and
   determining if the second time to complete printing is less than the first time to complete printing and the difference in printing time exceeds a threshold value; and
   moving the print job from the first queue to the second queue responsive to determining that the difference in printing time exceeds the threshold value,
   wherein the queue management process is performed repeatedly for the print job to move the print job between queues multiple times.

8. The method of claim 7, further comprising:
performing the queue management process whenever a predetermined amount of time has passed.

9. The method of claim 7, wherein estimating the first time to print the first print job comprises:
determining a speed of the first printer;
determining a number of pages to be printed in the first queue; and
estimating the first time to complete printing by dividing the number of pages to be printed in the first queue by the speed.

10. The method of claim 9, further comprising initiating the queue management process each time a triggering event is detected by the print server.

11. The method of claim 10, wherein the triggering event comprises one of: waiting a specific period of time, moving a print job between queues, or printing a print job.

12. The method of claim 7, further comprising:
estimating a third time to complete printing the print job if the print job were moved to a third queue for a third printer;
calculating another difference in printing time between the first time to complete printing and the third time to complete printing; and
moving the print job from the first queue to the third queue if the other difference in printing time exceeds the threshold value.

13. A print server that manages a plurality of printing queues for a plurality of printers, the print server comprising:
a control system that performs a queue management process to identify a print job within a first queue for a first printer, to estimate a first time to complete printing the print job on the printer from the first queue, and for each other queue in the plurality of queues, to:
estimate another time to complete printing the print job from the other queue if the print job were moved to the other queue;
calculate a difference in printing time between the first time to complete printing and the other time to complete printing; and
compare the difference to a threshold value; and
wherein the control system further identifies a candidate queue having the greatest difference in printing time between the first time to complete printing and the other time to complete printing; and
a queue management system that moves the print job to the candidate queue if the difference for the candidate queue exceeds the threshold value,
wherein over a period of time the control system repeatedly performs the queue management process for the print job in order to identify candidate queues having the greatest difference, and over the period of time the queue management system repeatedly moves the print job between the queues based on the identified candidate queues.

14. The print server of claim 13, wherein:
the control system performs the queue management process whenever a predetermined amount of time has passed.

15. The print server of claim 13, wherein the control system further:
determines a speed of the printer that prints the first queue;
determines a number of pages to be printed in the first queue; and
estimates the first time to complete printing by dividing the number of pages to be printed in the first queue by the speed.

16. The print server of claim 13, wherein the control system initiates the queue management process each time a triggering event is detected by the print server.

17. The print server of claim 16, wherein the triggering event comprises one of:
waiting a specific period of time, moving a print job between queues, or printing a print job.

* * * * *